June 5, 1951     I. J. GRUENBERG ET AL     2,555,484
SPRAG TYPE ONE-WAY CLUTCH

Filed July 2, 1945     3 Sheets-Sheet 1

INVENTORS
IVOR J. GRUENBERG
BY    CARL K. DAVIS

Whittemore Hulbert & Belknap
ATTORNEYS

June 5, 1951  I. J. GRUENBERG ET AL  2,555,484
SPRAG TYPE ONE-WAY CLUTCH
Filed July 2, 1945  3 Sheets-Sheet 2

INVENTORS
IVOR J. GRUENBERG
BY CARL K. DAVIS
Whittemore Hulbert & Belknap
ATTORNEYS June 5, 1951     I. J. GRUENBERG ET AL     2,555,484
SPRAG TYPE ONE-WAY CLUTCH Filed July 2, 1945     3 Sheets-Sheet 3

INVENTORS
IVOR J. GRUENBERG
BY CARL K. DAVIS
*Whittemore Hulbert & Belknap*
ATTORNEYS Patented June 5, 1951

2,555,484

UNITED STATES PATENT OFFICE 2,555,484

SPRAG TYPE ONE-WAY CLUTCH

Ivor J. Gruenberg, Pleasant Ridge, and Carl K. Davis, Detroit, Mich., assignors, by mesne assignments, to Formsprag Company, Van Dyke, Mich., a corporation of Michigan Application July 2, 1945, Serial No. 602,797

2 Claims. (Cl. 192—45.1)

The invention relates to one-way clutches of that type comprising coaxially arranged spaced members having oppositely facing parallel cylindrical surfaces and a series of sprags arranged between said surfaces.

It is the object of the invention to obtain a construction in which the whole series of sprags forms a unit which is insertable as such between the concentric cylindrical surfaces. It is a further object of the invention to provide this unit with resilient means for pressing each of the sprags into frictional contact with the cooperating surfaces. Still further, it is an object of the invention to obtain a method of manufacture by which all of the sprags are permanently secured to the resilient means and held thereby in proper relation to each other.

With these objects in view, the invention consists in the construction as hereinafter set forth.

In one-way clutches of the type above referred to it is necessary to provide some means for maintaining the sprags in frictional engagement with the cylindrical surfaces between which they are arranged. With our improved construction, we accomplish this result by a resilient coupling between the sprags of the series which is slightly deformed when the sprags are engaged with the cylindrical surfaces and, therefore, is biased to return the sprags to their original positions. The pressure exerted by this resilient element on each sprag is comparatively small but, nevertheless, is sufficient to produce initial frictional engagement with the cooperating surfaces so that the clutch will instantaneously engage when torque is transmitted therethrough in one direction of rotation. For forming the resilient element, we preferably employ a synthetic rubber, such, for instance, as "neoprene." This material, as is well known, is not injured by contact with lubricating oil and, therefore, may be used in connection with lubricated elements of a mechanism.

Figure 1:
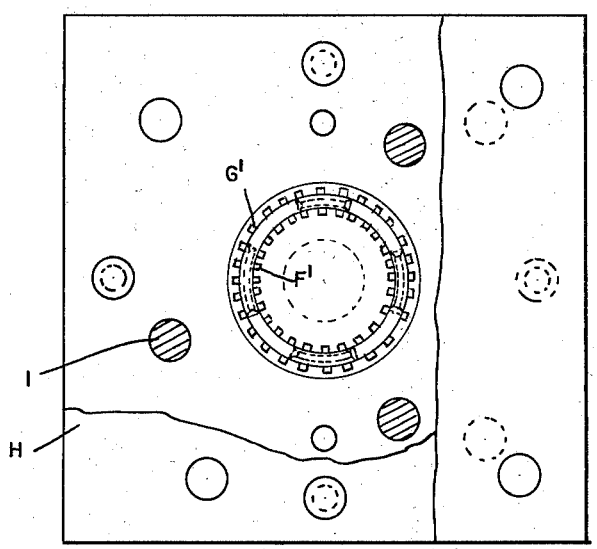
Fig. 1 is a plan view of a mold for forming our improved unit.
Figure 2:
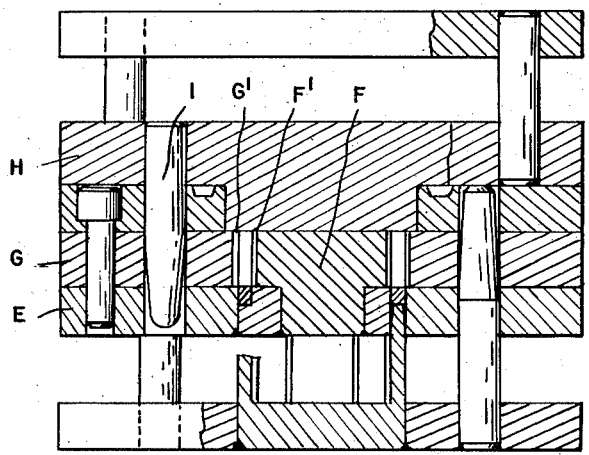
Fig. 2 is a vertical central section therethrough.
Figure 3:
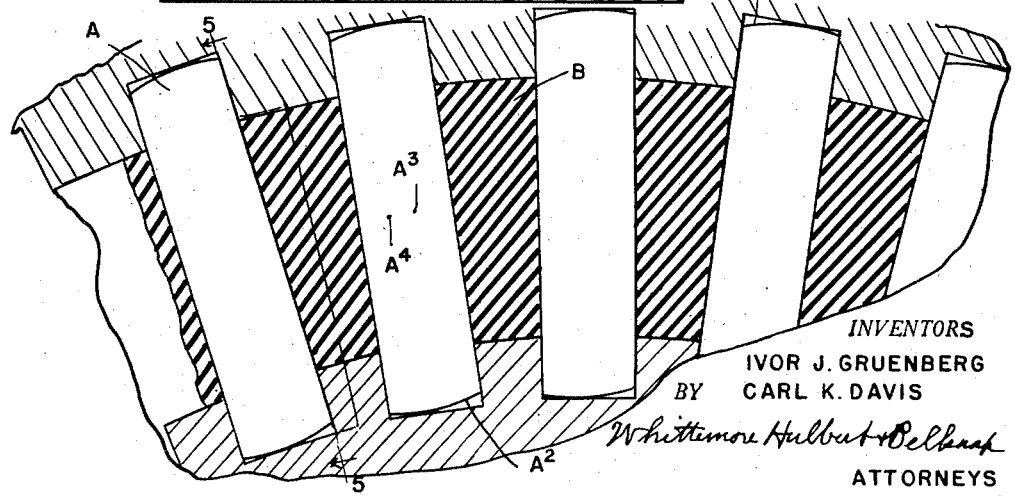
Fig. 3 is an enlarged sectional elevation of a portion of the unit in the mold.
Figure 4:
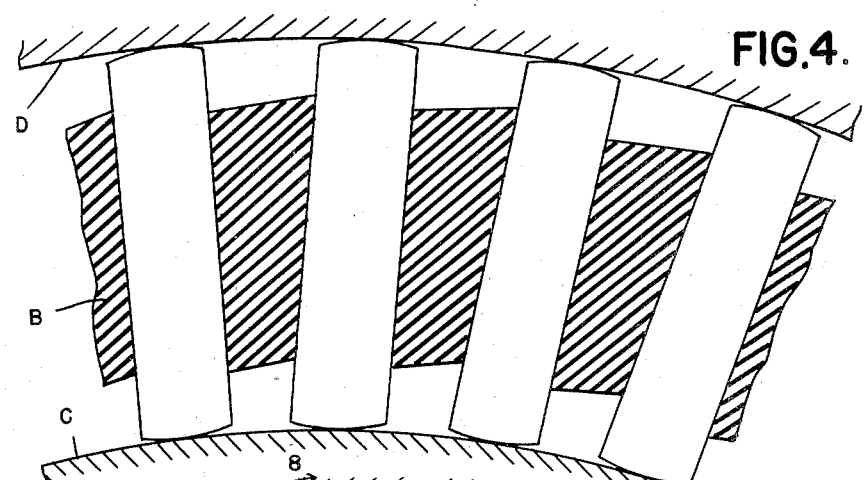
Fig. 4 is a similar view showing the unit in engagement with the cooperating cylindrical surfaces.

As shown in Fig. 3, a series of sprags A are arranged in spaced relation to each other to extend radially from a common center and at the same radial distance therefrom. Between these sprags are spacers B formed of "neoprene," or similar material, which is vulcanized to the sprags and together therewith forms an annulus. Each sprag is formed with arcuate end surfaces A' and A² concentric respectively with spaced centers A³ and A⁴. The length of the sprags is somewhat greater than the radial distance between the inner cylindrical surface C and the outer cylindrical surface D of coaxial clutch members. Thus, in order to insert an annulus between these surfaces it is necessary that the sprags be inclined to the radii of these surfaces. This will produce a slight deformation of the spacers B, as shown in Fig. 4, and this in turn creates a bias towards the original position which will continue as long as the device is in use.

In order to form the structure just described, we preferably employ a mold having a base section E, a central cylindrical section F mounted thereon, and a surrounding annular section G spaced from the section F. The sections F and G are provided with radially aligned notches F' and G' in their spaced surfaces adapted to receive the sprags A and to hold them in spaced relation to each other. The spaces between the sprags are filled with the green material for forming the "neoprene" and are closed by a cover plate H. All of the members E, G and H are held in proper registration with each other by pins I. After the mold has been filled as just described, it is placed in a hydraulic press and heated to the proper temperature and for the proper length of time to cure the green material and to vulcanize it to the surfaces of the sprags. Upon removal from the mold, the sprags and spacers are firmly attached to each other to produce the annular unit above described.

Figure 6:
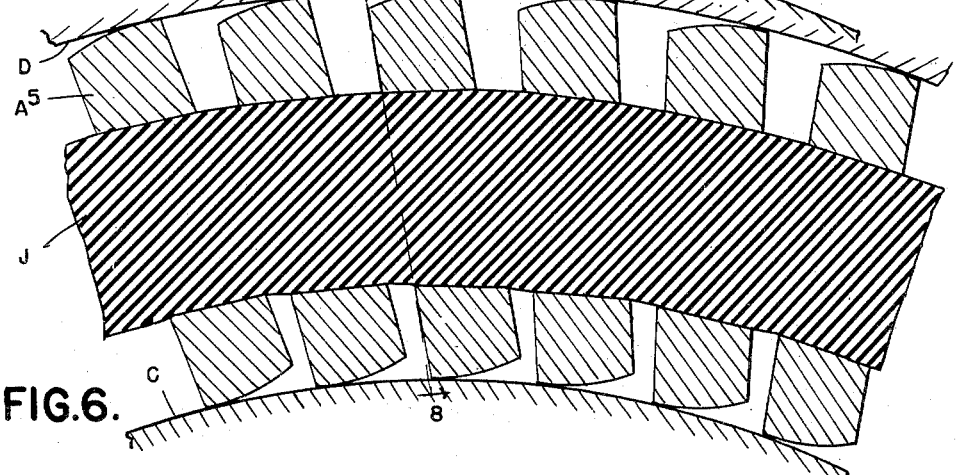
Figs. 6 and 7 are views similar to Figs. 3 and 4 showing a modified construction.
Figure 5:
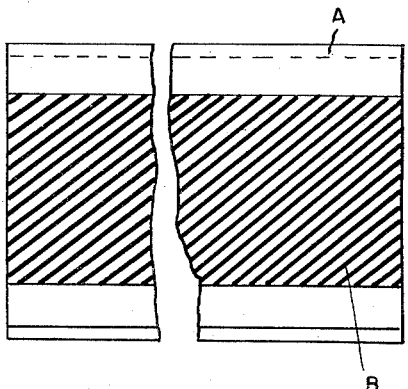
Fig. 5 is a cross section on line 5—5, Fig. 3.
Figure 8:
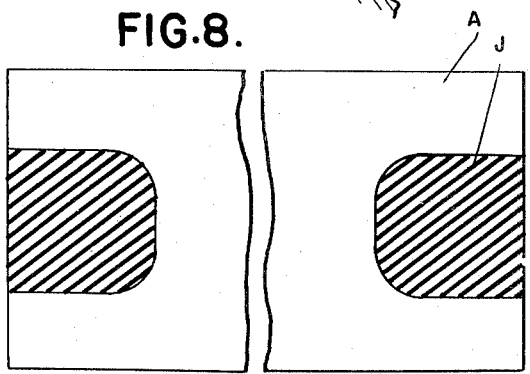
Fig. 8 is a cross section on line 8—8, Fig. 6.
Figure 7:
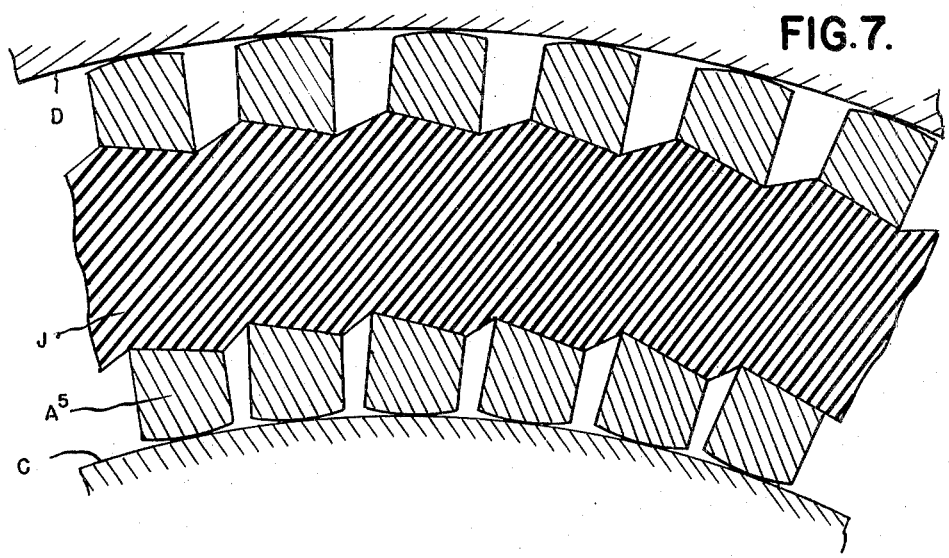

In the modified construction illustrated in Figs. 6 to 8, inclusive, instead of placing spacers between the sprags, they are held in proper spaced relation to each other by annular members formed of "neoprene." These engage grooves or channels in the opposite ends of the sprags and are vulcanized or otherwise caused to adhere thereto. Fig. 6 shows the construction as originally formed and before the unit is inserted into the clutch. It will be seen that the sprags $A^5$ are at a predetermined maximum inclination to the radius of the neoprene annulus J, such, for instance, as 9°. In Fig. 7 the unit is placed between the concentric cylindrical surfaces of the cooperating clutch members and the inclination of the sprags is reduced to a predetermined angle such, for instance, as 4°. It will be noted that this deforms the "neoprene" ring which, however, is thereby biased to return each sprag to its original angle. Consequently, the sprags are held in contact with the cylindrical surfaces so as to instantaneously lock when the relative rotation of the cooperating members is in one direction.

Figure 9:
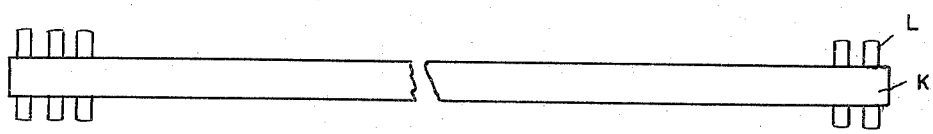
Fig. 9 is an elevation of a modified construction in which the unit as originally formed is straight.
Figure 10:
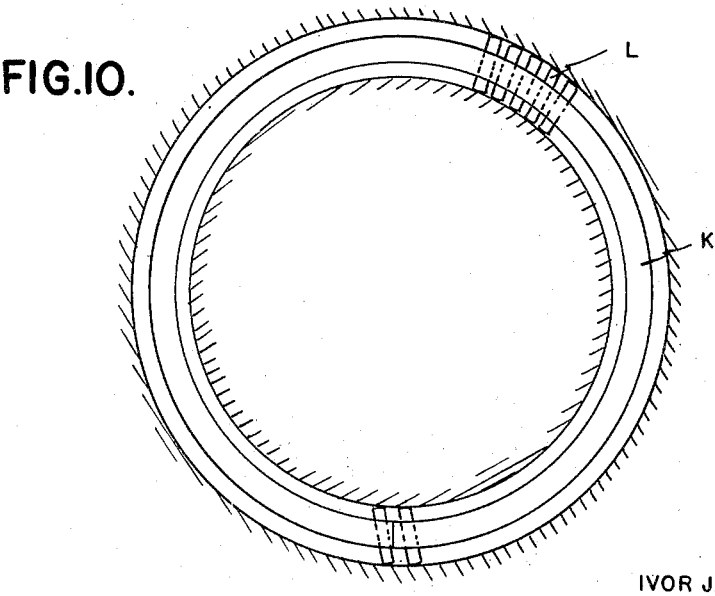
Fig. 10 is an elevation of the unit as shown in Fig. 9 after the same has been bent into annular form and inserted between the concentric cylindrical surfaces of the cooperating members.

In the modified construction illustrated in Figs. 9 and 10, a straight strip K of "neoprene" or other rubber-like material is vulcanized or otherwise secured to a series of transversely extending sprags L spaced from each other and at a predetermined angle of inclination. This strip may be cut into sections of suitable length, said section being then bent into annular form and inserted between the concentric surfaces of the cooperating clutch members. Thus, the same strip may be used for forming units applicable to clutches of different radial dimensions.

In all the constructions above described when engaged with the cooperating members of the clutch the resilient body between adjacent sprags will be deformed, being stretched along one diagonal axis thereof and compressed along a transverse diagonal axis thereby exerting a torque stress upon the sprags energizing them for clutching engagement.

What we claim as our invention is:

1. In a one-way rotary clutch including coaxial independently revoluble members presenting spaced opposite concentric surfaces; a connected series of spaced sprags inserted between said concentric surfaces, each connecting portion between adjacent sprags being formed of a resilient rubber-like solid body which is diagonally stretched and thereby tensioned to exert torque stresses upon said adjacent sprags for turning the same into frictional engagement with said surfaces.

2. In a one-way rotary clutch including coaxial independently revoluble members presenting spaced opposite concentric surfaces; a connected series of spaced sprags inserted between said concentric surfaces, each connecting portion between adjacent sprags being formed of a resilient rubber-like solid body which is stretched and placed under tension along one diagonal axis thereof, and contracted along a diagonal axis which is transverse to the first mentioned diagonal axis to exert torque stresses on the said adjacent sprags to turn the same into frictional engagement with said concentric surfaces.

IVOR J. GRUENBERG.
CARL K. DAVIS.

REFERENCES CITED

The following references are of record in the file of this patent:

UNITED STATES PATENTS

| Number | Name | Date |
|---|---|---|
| 1,923,283 | Stokes | Aug. 22, 1933 |
| 2,035,925 | Seamark | Mar. 31, 1936 |
| 2,075,130 | Osterholm | Mar. 30, 1937 |
| 2,364,280 | Dodge | Dec. 5, 1944 |
| 2,366,842 | Dodge et al. | Jan. 9, 1945 |
| 2,366,843 | Dodge et al. | Jan. 9, 1945 |